Jan. 4, 1927.
H. W. MUHLEISEN
1,612,982
EMERGENCY BRAKE FOR AUTOMOBILES
Filed March 23, 1921
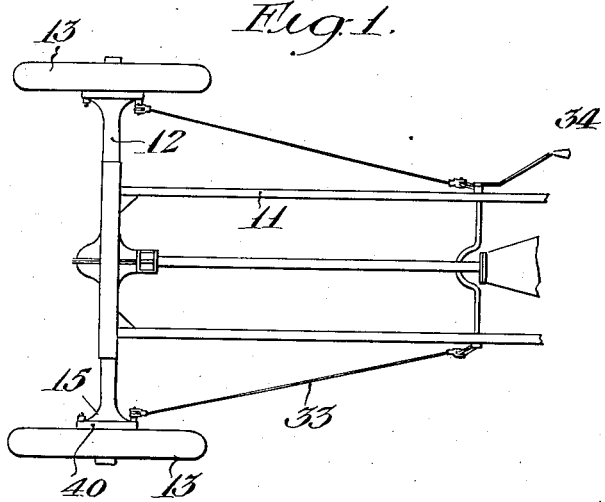
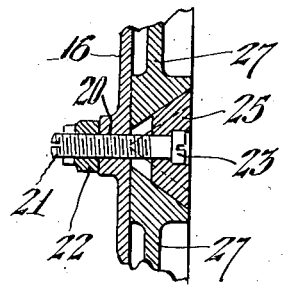
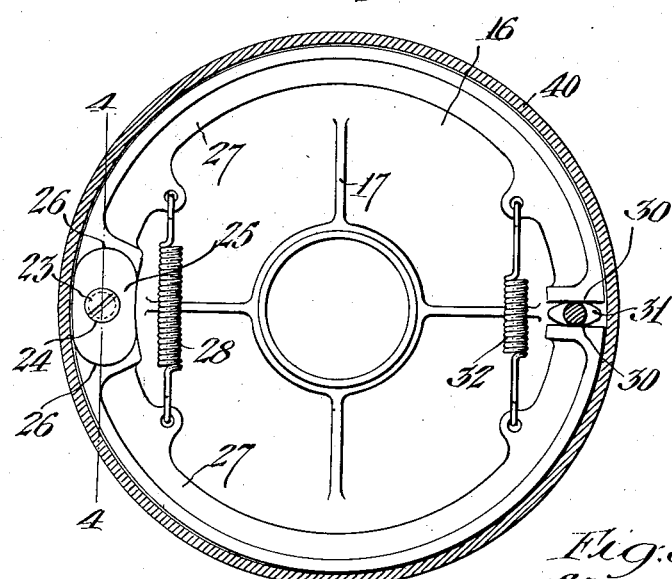
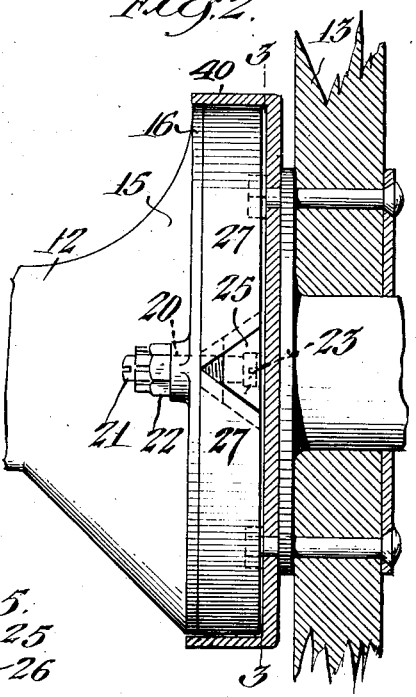
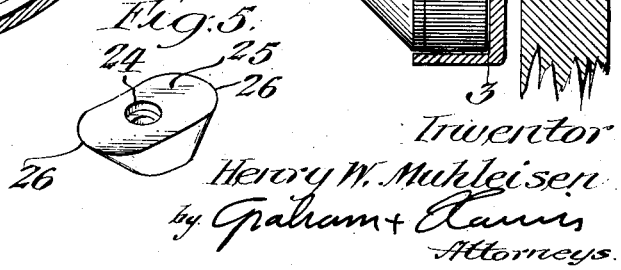
Inventor
Henry W. Muhleisen
by Graham + Harris
Attorneys.

Patented Jan. 4, 1927.

1,612,982

UNITED STATES PATENT OFFICE.

HENRY W. MUHLEISEN, OF LOS ANGELES, CALIFORNIA, ASSIGNOR TO W. S. RUSH & CO., A PARTNERSHIP CONSISTING OF W. S. RUSH, E. S. RUSH, AND B. C. GRAVES, OF LOS ANGELES, CALIFORNIA.

EMERGENCY BRAKE FOR AUTOMOBILES.

Application filed March 23, 1921. Serial No. 454,727.

My invention relates to automobiles and particularly to the emergency brake used thereon. This emergency brake consists of two cast iron brake shoes which are placed inside a brake drum carried by the wheel, and which are expanded by means of a cam which causes them to grip the inner surface of the drum. As the brake consists essentially of cast iron surfaces bearing against other cast iron surfaces, considerable wear results from the continued use of the brake and the inner cast iron shoes and brake drum soon become so worn that their efficiency is practically destroyed.

The principal object of my invention is to provide means which may be readily incorporated in a standard automobile for taking up the wear and restoring the full power of the emergency brake.

A further object of the invention is to provide means for accomplishing the above object which means may be applied to any automobile without the necessity for any machining operations on the automobile itself.

A further object of my invention is to provide a brake in which the wear thereof is taken up by an adjusting wedge which is placed between the ends of the cast iron segments forming the brake proper, this wedge and the segments being mutually so shaped that they are mutually self-adjusting.

Further objects and advantages will be made evident hereinafter.

Referring to the drawing,

Fig. 1 is a plan view of a portion of an automobile equipped with my invention.

Fig. 2 is an elevation of a portion of the apparatus shown in Fig. 1 as seen from the rear, the wheel and brake drum being shown in section to better illustrate my invention.

Fig. 3 is a section on a plane represented by the line 3—3 of Fig. 2.

Fig. 4 is a partial section on a plane represented by the line 4—4 of Fig. 3.

Fig. 5 is a perspective view of the expanding wedge.

In the form of the invention shown, 11 is the frame of an automobile having a rear axle 12, and two rear wheels 13. The rear axle 12 is expanded at 15 to form a plate 16 provided with ribs 17. The standard brake consists of two cast iron segments which are pivoted on a bolt passing through a hole 20. I utilize the hole 20 for a bolt 21 secured in place by a nut 22, this bolt having a head 23 fitting in a recess 24 in a wedging member 25. The wedging member 25 has the form shown in Fig. 5, having rounded edges 26 against which the free ends of two brake shoes 27 rest, the shoes being held in place by means of tension springs 28. The members 27 are provided with flat ends 30 held against a cam 31 by a second tension spring 32. The surface 30 and the members 31 and 32 form a portion of the standard brake. The cam 31 is actuated by suitable levers through rods 33 from a brake lever 34. The members 33 and 34 and the attached levers are also old in the present form of automobiles and simply serve as a means for turning the cam 31 about its axis. Whenever the cam 31 is turned, the surfaces 30 are forced apart against the action of the spring 32 and the cast iron shoes are forced outwardly against the inside of a brake drum 40 carried on the wheel 13.

If the automobile has been used for some time, the surfaces 30 and the cam 31 tend to wear and the outer surface of the shoes 27 and the inner surface of the brake drum 40 also tend to wear. To compensate for this wear, I provide the wedging member 25 which may be pulled to the left as viewed in Fig. 4 by means of the bolt 21. If the wedge 25 is pulled towards the plate 16 or towards the left as viewed in Figs. 2 and 4, it tends to force the ends of the shoes 27 apart against the tension of the spring 28, thus expanding the brake and compensating for the wear.

In practice the brake may be very quickly adjusted by pulling the brake lever 34 into the position at which the brake should be tightly locked and securing it in that position, which is automatically accomplished by means of a ratchet and pawl. The bolt 21 is then set up until the wedge 25 is tight, the members 27 then being forced outwardly solidly against the interior of the brake shoe 40. The bolt 21 is secured by the nut 22 so that it cannot work loose and the brake is left solidly locked in its engaged position. By releasing the brake lever 34, the brake can then be released and it will be found to be accurately adjusted. It should be noted that this adjustment is very quickly made without dismantling any portion of the automobile and that it can be made anywhere by means of a screw-driver and a wrench. It should be further noted that the adjusting screws 21 are in a very accessible position so that this adjustment can be made on the road any time. By means of my invention, the emergency brake of the automobile can be kept adjusted at all times until the brake shoes are actually worn out. I am aware that other inventors have made brakes in which the wear upon the segments corresponding to the brake shoes 27 is taken up by a wedge somewhat similar in purpose to my wedge 25. All such previous types of brake with which I am familiar have the serious defect that the wedge is not self-centering and independent means must be provided for centering it. In my invention the wedge 25 is symmetrical about an axis at right angles to the line 4—4 of Fig. 3 but it is not symmetrical about an axis defined by the line 4—4 of that figure; it will be noted that the centers of the arcs forming the rounded edges 26 of the wedge are inside the line 4—4 of that figure; that is they are nearer the center of the brake than that line. This throws the direction of the thrust of each brake shoe on a line inclined to the vertical and inside the line 4—4. By using this particular form of wedge I form a wedge that is self-centering and needs no arms or other devices to keep the two brake shoes in balance at all times.

I claim as my invention:

A brake comprising: a brake drum having an internal cylindrical braking surface; a pair of arcuate brake shoes fitting inside said braking surface of said drum; one end of each of said shoes being concavo-conical; a wedge formed with convexo-conical ends fitting in said concavo-conical ends of said shoes; a bolt extending through the center of said wedge for drawing the ends of said wedge into said ends of said shoes and for securing said wedge within said drum, the axes of said conical ends of said wedge being disposed inwardly of a plane passing through the center of said wedge and perpendicular to a radius passing through the center of the wedge; and an operating member between the other ends of said shoes for spreading said ends to cause said shoes to contact with said internal braking surface.

In testimony whereof, I have hereunto set my hand at Los Angeles, California, this 16th day of March, 1921.

HENRY W. MUHLEISEN.